Sept. 29, 1964  J. W. CARTER ETAL  3,150,855
RESILIENT SUSPENSION FOR VEHICLE SEAT
Filed Jan. 17, 1962  3 Sheets-Sheet 1

INVENTORS
JOHN W. CARTER
BY NORMAND R. ROLLINS
RICHARD E. GUHL

ATTORNEYS

Sept. 29, 1964  J. W. CARTER ETAL  3,150,855
RESILIENT SUSPENSION FOR VEHICLE SEAT
Filed Jan. 17, 1962  3 Sheets-Sheet 2
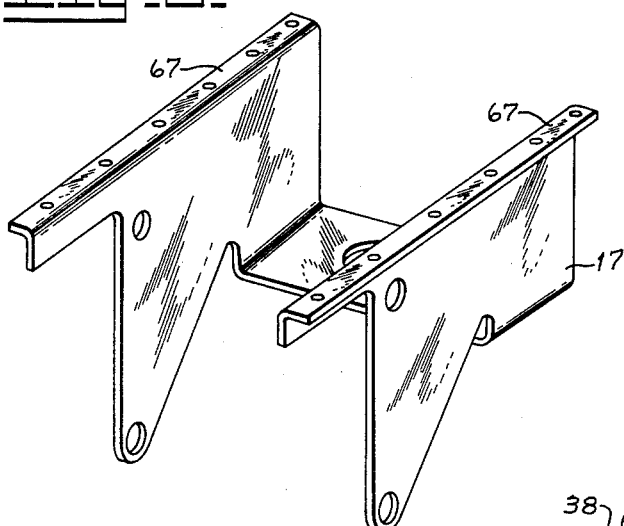
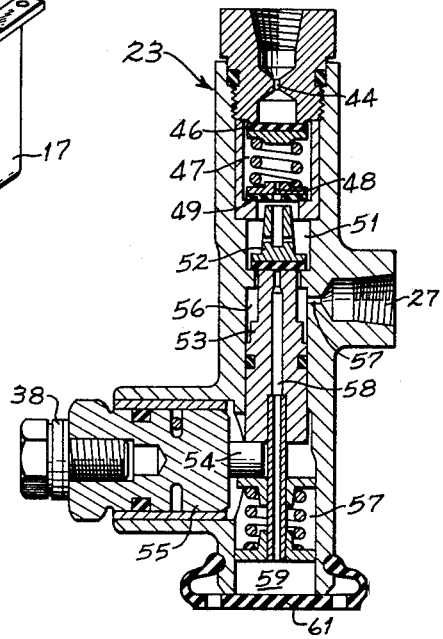
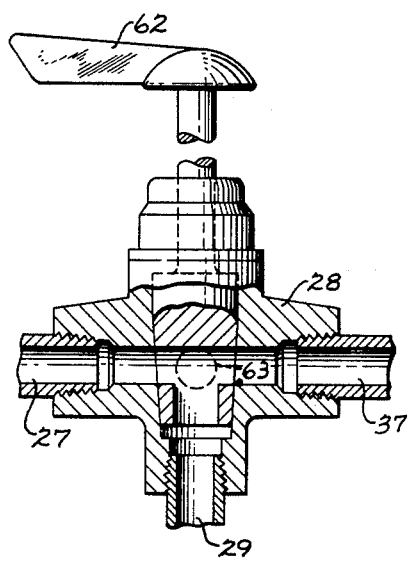
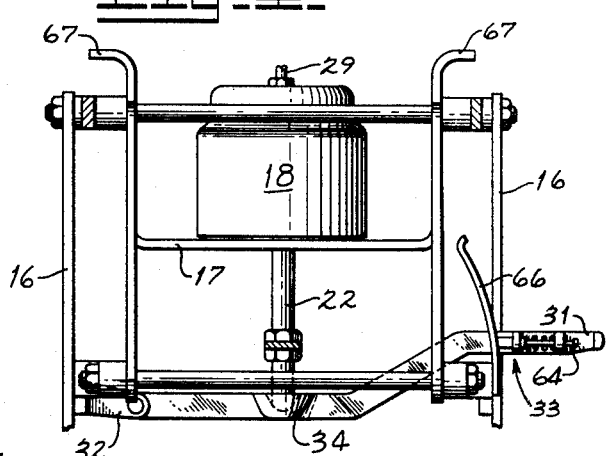
INVENTORS
JOHN W. CARTER
BY NORMAND R. ROLLINS
RICHARD E. GUHL
ATTORNEYS Sept. 29, 1964     J. W. CARTER ETAL     3,150,855
RESILIENT SUSPENSION FOR VEHICLE SEAT
Filed Jan. 17, 1962     3 Sheets-Sheet 3

INVENTORS
JOHN W. CARTER
NORMAND R. ROLLINS
RICHARD E. GUHL
BY
ATTORNEYS

United States Patent Office 3,150,855
Patented Sept. 29, 1964

3,150,855
RESILIENT SUSPENSION FOR VEHICLE SEAT
John W. Carter and Normand R. Rollins, Peoria, and Richard E. Guhl, Pekin, Ill., assignors to Caterpillar Tractor Co., Peoria, Ill., a corporation of California
Filed Jan. 17, 1962, Ser. No. 166,864
5 Claims. (Cl. 248—400)

This invention relates to an improved seat mounting structure and more particularly to a vehicle seat mounting structure which provides a relatively soft ride and maintains the seat at an adjustable, predetermined height regardless of the weight of the operator.

In certain types of vehicles such as heavy duty trucks or tractors, travel of the vehicle causes considerable jarring or vibration of the vehicle frame which is transmitted to the operator's seat supported thereon. This not only fatigues the operator but also renders manipulation of the vehicle by the operator and any manipulatable auxiliary mechanism that might be propelled thereby difficult if not dangerous. To overcome this effect, pneumatic means are popularly used to soften the ride. The use of pneumatic means to reduce the jarring experienced by the vehicle operator, however, introduces the undesirable feature of providing a seat height relative to the vehicle controls which is dependent upon the weight of the operator. It thus becomes necessary to regulate the pneumatic system each time a different operator utilizes the vehicle.

Thus, it is an object of the present invention to provide improved mounting means for a seat frame on a vehicle frame which cushions the seat from jarring forces imparted to the vehicle frame and which maintains the seat height relative to the vehicle control at a predetermined height regardless of the weight of the operator.

It is another object of the present invention to provide a pneumatically cushioned vehicle seat which does not have the tendency to rise or follow the operator as he dismounts from the seat.

Further and more specific objects and advantages of the invention are made apparent in the following specification wherein a preferred form of the invention is described by reference to the accompanying drawings.

In the drawings:

FIG. 3 is an isometric view of a U-shaped member which supports the air cushion of the present invention;

FIG. 4 is a front elevation of the U-shaped member of FIG. 3 together with the air cushioning means and the means for adjustment thereof;

FIG. 5 is a sectional elevation of the leveling valve shown in FIG. 1;

FIG. 6 is a side elevation and partial section view of a vent valve shown in FIG. 1.

Figure 1:
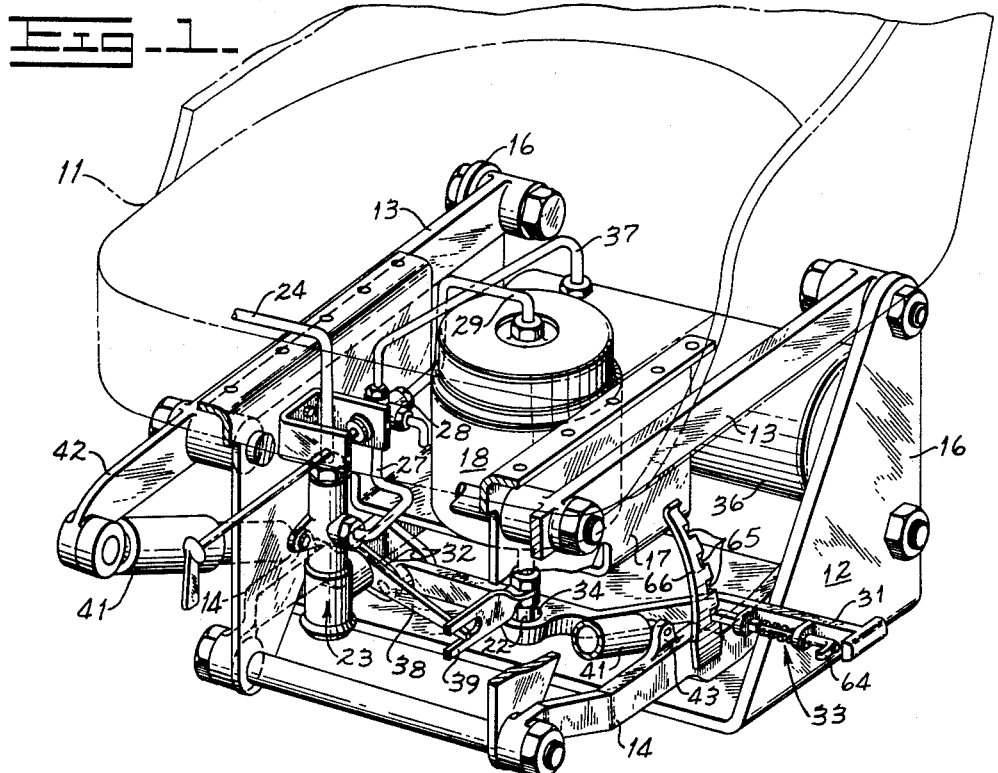
FIG. 1 is an isometric view of the seat mounting means and attendant pneumatic system of the present invention.
Figure 2:
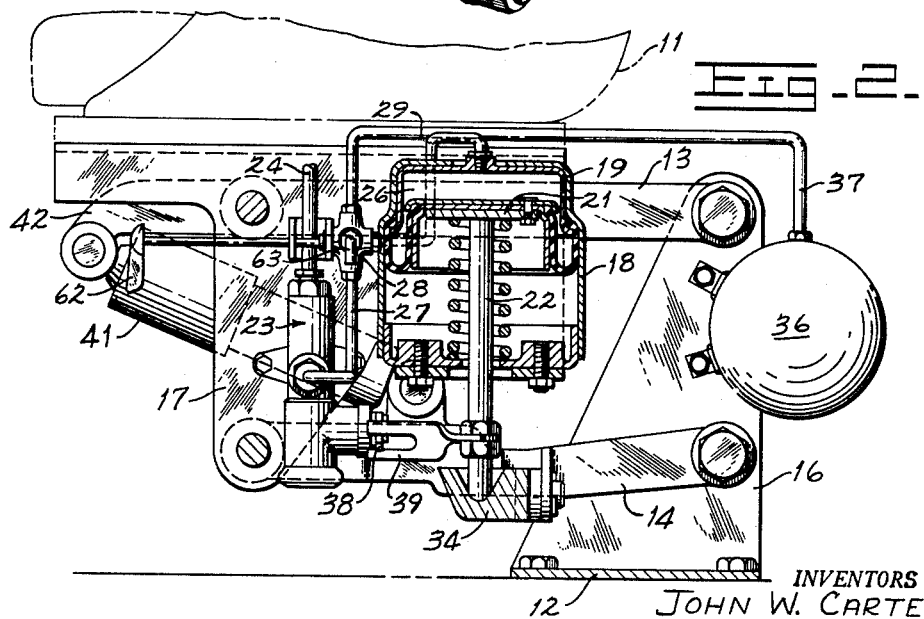
FIG. 2 is a side elevation of the mounting means and pneumatic system of the present invention with parts broken away to show more clearly the structure.

Referring now to FIG. 1, a seat 11 is supported on a resilient, parallelogram type linkage comprising a U-shaped bracket 12 and a pair of upper and lower links 13 and 14, respectively, which are pivotally supported at one end on the upstanding legs 16 of bracket 12, while bracket 12 is secured to the vehicle floor plate. A U-shaped support member 17 (shown alone in FIG. 3) is supported on the forward ends of links 13 and 14. An air cylinder 18 for providing pneumatic cushioning to seat 11 is secured to the intermediate portion of U-shaped member 17. Air cylinder 18 comprises a housing cylinder 19, a spring loaded diaphragm type piston 21, and a piston rod 22 which extends through an aperture in the lower end of cylinder 19, as best seen in FIG. 2.

A leveling valve 23 is secured to member 17 and is pneumatically connected to an air supply (not shown) by a line 24. Valve 23 is pneumatically connected to an upper chamber 26 of air cylinder 18 by means of an air line 27, an outside vent valve 28 and an air line 29.

A lever 31 is pivoted at one end to a bracket 32 intermediate the ends of one of the lower links 14 and extends transversely of the seat support to where its other end is adjustably supported on the other link 14 by means of a latch mechanism 33. Lever 31 has an indented boss 34 (see FIG. 2) for engagement with the lower end of piston rod 22.

A small capacity accumulator tank 36 is pneumatically connected to pressure chamber 26 of air chamber 18 and leveling valve 23 by means of an air line 37, vent valve 28, air line 29 and air line 27. Air tank 36 supplements the cushioning provided by the air in chamber 26. An actuating lever 38 is rotatably connected to leveling valve 23 and extends transversely of the seat support to where it engages a slotted bracket 39 which is secured to piston rod 22. A pair of conventional automotive shock absorbers 41 are pivotally connected at their upper ends to forwardly extending portions 42 of links 13 and at their lower ends to brackets 43 intermediate the end of links 14.

In operation, air is introduced to chamber 26 of air cylinder 18 through inlet line 24, leveling valve 23, air line 27, valve 28 and air line 29. The weight of an operator on seat 11 compresses the air in chamber 26 of air cylinder 18 and air tank 36. The compression of the air in chamber 26 allows seat 11, bracket 17 and air cylinder 18 to move downward in relation to piston 21 and piston rod 22 which rests on boss 34. Since leveling valve 23 is supported on member 17 downward movement of member 17 will cause relative motion between piston rod 22 and leveling valve 23 which will in turn induce rotation of actuating lever 38.

The effect of the rotation of actuating lever 38 can best be seen with reference to FIG. 5. Air is introduced to leveling valve 23 from a supply of air under pressure (not shown) through a small orifice 44. The air from orifice 44 passes through a one way check valve 46 into a first chamber 47. An orifice 48 in a disc 49 which forms a lower wall of chamber 47 permits the air to enter a second chamber 51 where it is blocked by a valve member 52 when a plunger 53 is in its normal centered position. The rotation of actuating lever 38 induces an eccentric cam 54, which is secured to a lever support plug 55, to un-seat valve 52 permitting the air in chamber 51 to pass into a chamber 56. Chamber 56 communicates through orifice 57 to air line 27 which in turn communicates with chamber 26 of air cylinder 18 through vent valve 28 and air line 29 (FIG. 2). Referring to FIGS. 1 and 2, it is seen that counter-clockwise rotation of actuating lever 38 (downward movement of seat 11) results in the communication of air chamber 26 with the main air supply. The main air supply will feed air to chamber 26 and tank 36 until the relative motion between piston rod 22 and leveling valve 23 sufficiently rotates actuating lever 38 to close valve 52 of leveling valve 23. The amount of rotation of lever 38 necessary to close valve 52 is equal to the amount of rotation caused by the introduction of the operator's weight on cushion 11 and thus the seat will be raised to its original height.

When the operator dismounts from seat 11 the relative motion between leveling valve 23 and piston rod 22 will cause a clockwise rotation of lever 38 which, in turn, actuates plunger 53 in a downward direction by means of a resilient connection 57. The downward movement of plunger 53 un-seats the upper end of plunger 53 from valve member 52 and permits the air in air chamber 26 to enter a coaxial bore 58 in plunger 53 where it is directed downward to a lower chamber 59. The air pressure in chamber 59 causes a rubber exhaust valve 61 to open and thereby allow seat 11 to return to its normal position.

Referring now to FIG. 6, vent valve 28 in its normal position provides communication between lines 27, 29 and 37 to permit the seat support to function in the manner previously described. Should the operator desire to remove his weight from the seat without the seat tending to follow him up he may rotate an actuating lever 62 which is effective in blocking lines 27 and 37 and to connect line 29 to an exhaust line 63. After the operator has resumed his position in the seat, rotation of lever 62 back to its normal position blocks line 63 and provides the previously described communication between lines 27, 29 and 37. At this stage, plunger 53 in leveling valve 23 will be displaced upward to admit air to pressure chamber 26 and thus return seat 11 to its original position.

The means by which a predetermined height of the seat may be adjusted to complement the leg length of the operator is best seen with reference to FIGS. 1 and 4. The predetermined height of the seat may be adjusted by disengaging a spring loaded plunger 63 from one of a plurality of notches 64 in an upstanding plate 66 and then rotating lever 31. When lever 31 is rotated in an upward direction, piston rod 22 is forced upward causing a relative movement between slotted member 39 and leveling valve 23 which causes rotation of lever 38. The counter-clockwise rotation of lever 38 caused by raising lever 31 admits additional air into chamber 26 as described supra. The additional air in chamber 26 raises support structure 17 which in turn raises seat 11. As seat 11 raises actuating lever 38 rotates in a clockwise position and shuts off the air supply to chamber 26. When lever 31 is rotated in a downward direction the air in chamber 26 is vented to the atmosphere via valve 61 and the predetermined position is thereby lowered.

The shock absorbers 41 are effective to damp the spring action of air cylinder 18 and thus retard excessive bounce of the seat when operating in extremely rough terrain. Lateral adjustment of the seat is provided by conventional ball bearing track (not shown) which is furnished with the seat assembly and is secured to a pair of outwardly extending flanges 67 on structure 17.

Figure 7:
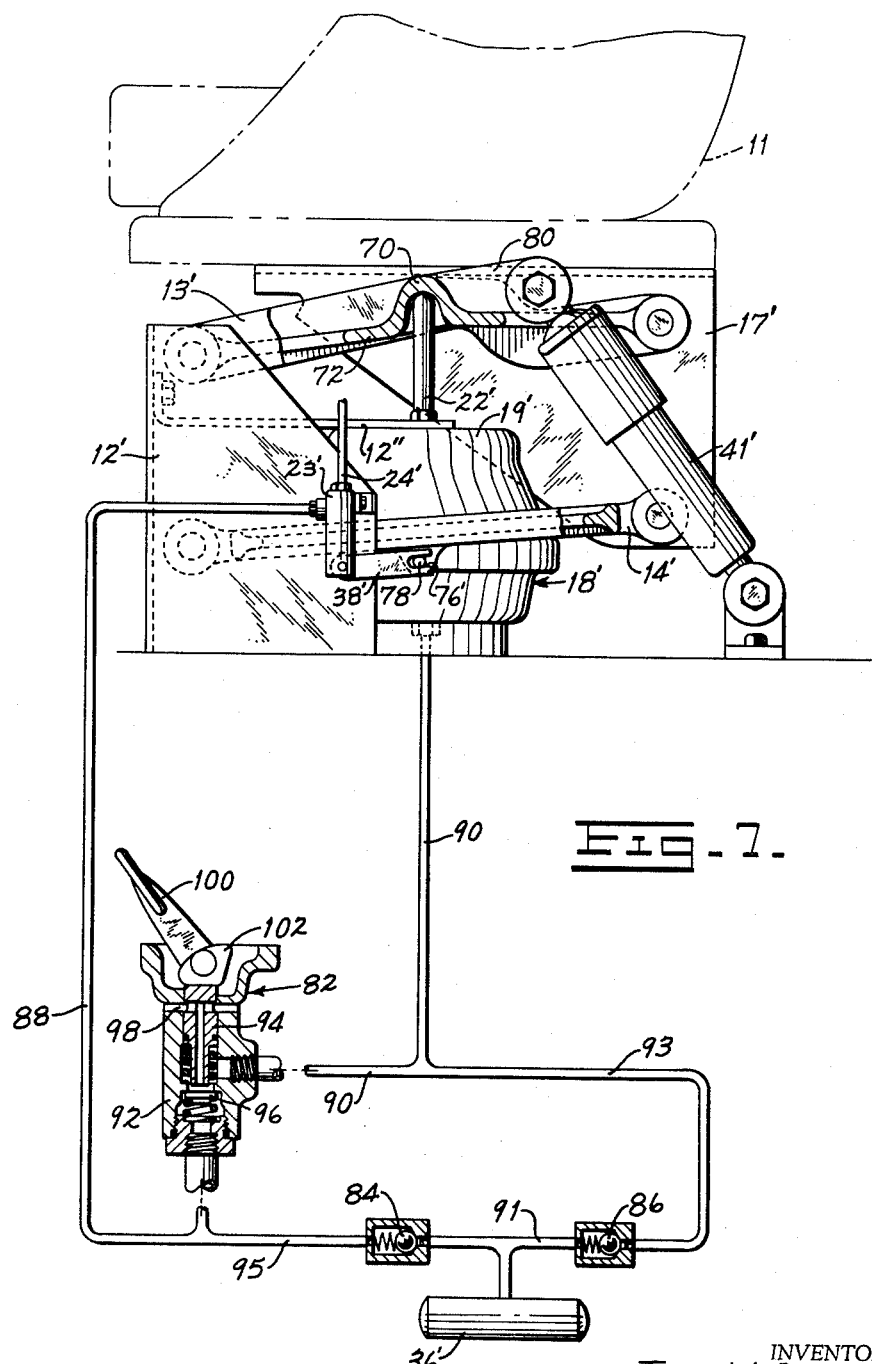
FIG. 7 is a side elevation of an alternate embodiment of the invention with portions shown schematically.

The embodiment of the invention illustrated in FIG. 7 utilizes many of the same components as the embodiment shown in FIG. 1, but has them arranged in a slightly different manner. The seat 11 is supported on a pair of seat support members 17' which are in turn secured to bracket 12' by means of parallel linkage formed by upper link 13' and lower links 14'. A web 72 of link 13' has a central dimple 70 which receives the end of piston shaft 22' of air cylinder 18'. The housing 19' of cylinder 18' rests on the vehicle floor plate and is rigidly secured to bracket 12' by means of extending arm 12" which is bolted to or otherwise secured to the bracket. A leveling valve 23' is mounted on bracket 12' so as to be stationary with respect to movement of seat 11. An actuating lever 38' is pivotally secured to leveling valve 23' at one end and engages a bolt 78 on link 14' in its other slotted end 76'. Vertical positioning of seat 11 is transmitted to link 14' which thereby induces rotation of actuating lever 38' which in turn controls leveling valve 23' in the manner described with reference to FIG. 5 above.

Instead of a pair of shock absorbers 41 as illustrated with reference to FIG. 1, the embodiment of FIG. 7 utilizes a single shock absorber element 41' centrally located and engaging a bracket 80 on web 72 of link 13' at one end and the vehicle floor at its other end. In this manner the seat is furnished with an added resilient member for a more comfortable ride.

A pneumatic system employing a two position valve 82 and a pair of check valves 84 and 86 replaces the three way valve described with reference to the embodiment of FIG. 1. A high pressure supply of air (not shown) communicates with valve 23' through inlet line 24'. Communication between valve 23' and valve 82 is established by means of conduit 88 while conduit 90 furnishes communication between cylinder 18' and valve 82. A T-shaped conduit 91 connects tank 36' with check valves 84 and 86. Check valve 86 is connected to conduit 90 by means of conduit 93, while check valve 84 connects to conduit 88 by means of conduit 95. When valve 82 is in the "on" position, leveling valve 23', valve 82, air cylinder 18' and accumulator tank 36 are pneumatically connected to permit operation of the suspension and leveling circuits. Check valve 84 prevents the high pressure air supply from being directed to tank 36' when valve 23' is positioned to direct air to cylinder 18'. When the vehicle operator desires to dismount without the seat following him up under influence of the air in cylinder 18', he actuates valve 82 to the "off" position. This is effective to block communication between valve 23' and valve 82, and connect cylinder 18' to exhaust ports 98. The air in take 36' is prevented from escaping by check valve 86 which permits air flow only in the direction of the tank. When the operator sits down in the seat he actuates valve 82 to the "on" position to re-establish communication between lines 88 and 90 and blocks the exhaust port to permit the seat to be returned to its predetermined position by air introduced through valve 23' from the source.

Valve 82, shown in the "off" position in FIG. 7 comprises a body 92, a spring biased plunger 94 and a spring biased check valve 96. In this position check valve 96 prevents communication between valve 23' and cylinder 18' while communication is established between cylinder 18' and exhaust ports 98. Thus in this position the cylinder 18' is exhausted of air and the operator can dismount seat 11 without the effect of compressed air in cylinder 18'. To establish the communication which conditions the system to perform the function of maintaining a predetermined seat height of seat 11, control lever 100 of valve 82 is positioned to a generally vertical position at which a cam 102 urges plunger 94 downward so as to close exhaust ports 98 and open check valve 96. When valve 82 is thus conditioned communication exists between leveling valve 23' and cylinder 18' allowing them to cooperate to provide the desired function.

It is seen that the alternate embodiment of FIG. 7 is in principle much the same as the embodiment of FIG. 1, but has the advantage of placing the seat support mechanism in a position which is less likely to interfere with the operator's feet. It also enables the use of a valve such as 82 which is generally of a more rugged and durable nature than valves meeting the description of valve 28 of FIG. 6.

What is claimed is:

1. In a vehicle seat suspension system the combination comprising;

means for resiliently supporting a vehicle seat on a vehicle frame;

a compressible air chamber having a fixed member and a movable member, said movable member being responsive to downward movement of said vehicle seat by the compression of air in said air chamber;

and a leveling valve communicating with said air chamber, a supply of air under pressure and the atmosphere;

said leveling valve being responsive to downward motion of said seat from a predetermined position by communicating said air supply with said air chamber and being responsive to upward motion of said seat from a predetermined position by communicating said air chamber with the atmosphere.

2. In a vehicle seat suspension system the combination comprising;
   means resiliently supporting a vehicle seat on a vehicle frame;
   a compressible air chamber having a fixed member secured to the vehicle frame, and a movable member which responds to downward movement of the seat by compressing the air in said air chamber;
   a venting valve communicating with said air chamber and the atmosphere; and
   a leveling valve communicating with said venting valve, and a source of air under pressure;
   said leveling valve responsive to downward motion of said seat from a predetermined position to communicate said air supply with said venting valve and responsive to upward motion of said seat above a predetermined position to communicate said air chamber with the atmosphere;
   said venting valve communicating said leveling valve with said air chamber in one of its positions and communicating said air chamber with the atmosphere in another position.

3. In a vehicle seat suspension system the combination comprising;
   means for resiliently supporting a vehicle seat on a vehicle frame;
   a compressible air chamber having a semi-fixed lower member and a movable upper member;
   said upper member attached to said vehicle seat such that downward movement of said seat results in compression of the air in said air chamber;
   means for securing said lower member at one of a plurality of fixed vertical positions;
   and a pneumatic leveling valve attached to said vehicle seat and pneumatically communicating with said air chamber, a supply of air under pressure and the atmosphere;
   said leveling valve being responsive to downward motion of said seat from a predetermined position by communicating said air supply with said air chamber and being responsive to upward motion of said seat from a predetermined position by communicating said air chamber with the atmosphere.

4. In a vehicle seat suspension system the combination comprising means for resiliently supporting a vehicle seat on a vehicle frame;
   a compressible air chamber having a semi-fixed lower member and a movable upper member;
   said upper member attached to said vehicle seat such that downward movement thereof results in compression of the air in said air chamber;
   means for securing said lower member at one of a plurality of fixed vertical positions;
   a venting valve pneumatically communicating with an outside vent and said air chamber;
   a pneumatic leveling valve attached to said vehicle seat and pneumatically communicating with a supply of air under pressure, the atmosphere and said venting valve;
   said leveling valve being responsive to downward motion of said seat from a predetermined position by communicating said air supply with said venting valve and being responsive to upward motion from a predetermined position by communicating said venting valve with the atmosphere;
   said venting valve having one position in which said leveling valve and said air chamber are in pneumatic communication and another position in which said air chamber and said outside vent are in pneumatic communication.

5. The invention as claimed in 4 wherein said venting valve further pneumatically communicates with a small capacity air tank, said air tank pneumatically communicating with said air chamber when said air chamber communicates with said leveling valve.

References Cited in the file of this patent
UNITED STATES PATENTS

| | | |
|---|---|---|
| 1,664,510 | Hughes | Apr. 3, 1928 |
| 2,760,552 | Decker | Aug. 28, 1956 |
| 2,959,426 | Augustin | Nov. 8, 1960 |
| 3,036,844 | Vogel | May 29, 1962 |